(12) United States Patent
Wilkerson et al.

(10) Patent No.: US 9,238,338 B2
(45) Date of Patent: Jan. 19, 2016

(54) METHOD OF FABRICATING COMPOSITE LAMINATE STRUCTURES ALLOWING PLY SLIPPAGE DURING FORMING

(75) Inventors: Randall Dow Wilkerson, O'Fallon, MO (US); James R. Fox, University City, MO (US); Charles R. Prebil, University City, MO (US)

(73) Assignee: THE BOEING COMPANY, Chicago, IL (US)

( * ) Notice: Subject to any disclaimer, the term of this patent is extended or adjusted under 35 U.S.C. 154(b) by 725 days.

(21) Appl. No.: 13/313,382

(22) Filed: Dec. 7, 2011

(65) Prior Publication Data
US 2013/0149498 A1 Jun. 13, 2013

(51) Int. Cl.
*B29C 70/00* (2006.01)
*B29C 70/54* (2006.01)
*B29C 70/40* (2006.01)
*B29C 53/04* (2006.01)

(52) U.S. Cl.
CPC ............ *B29C 70/543* (2013.01); *B29C 53/04* (2013.01); *B29C 70/40* (2013.01); *Y02T 50/433* (2013.01); *Y10T 29/49826* (2015.01); *Y10T 428/24479* (2015.01)

(58) Field of Classification Search
CPC .... B29C 70/40; B29C 70/525; B29C 70/543; B29C 65/70; B29C 53/04; B32B 37/30; B32B 37/0084
USPC ........ 156/308.2, 308.4, 309.6, 245, 290, 291, 156/324.4, 307.1, 307.7; 264/257, 258
See application file for complete search history.

(56) References Cited

U.S. PATENT DOCUMENTS

| | | | |
|---|---|---|---|
| 5,039,371 A | | 8/1991 | Cremens et al. |
| 5,217,656 A | * | 6/1993 | Buckley et al. ............... 264/490 |
| 5,418,035 A | * | 5/1995 | Iguchi et al. .................. 428/119 |
| 5,843,355 A | * | 12/1998 | McCarville et al. .......... 264/152 |
| 6,017,410 A | * | 1/2000 | Baccini ......................... 156/290 |
| 6,214,447 B1 | | 4/2001 | Nakagawa et al. |
| 7,219,828 B2 | | 5/2007 | Lombardo |
| 7,824,514 B2 | | 11/2010 | Venkitaraman et al. |
| 8,333,858 B2 | | 12/2012 | Rubin et al. |
| 2003/0138602 A1 | | 7/2003 | Lorenz et al. |
| 2007/0175572 A1 | * | 8/2007 | Rubin et al. .................. 156/196 |
| 2007/0175575 A1 | | 8/2007 | Rubin et al. |
| 2010/0136293 A1 | | 6/2010 | Kubryk et al. |

FOREIGN PATENT DOCUMENTS

EP 0056352 A1 7/1982

OTHER PUBLICATIONS

EP search report dated Mar. 18, 2013 regarding application 12195060.4-1703, reference NAM/P124892EP00, applicant The Boeing Company, 7 pages.
European Patent Office Communication, dated Apr. 1, 2015, regarding Application No. EP12195060.4, 5 pages.

* cited by examiner

*Primary Examiner* — John Goff
(74) *Attorney, Agent, or Firm* — Yee & Associates, P.C.

(57) ABSTRACT

A composite structure having a contoured cross section is fabricated by assembling a flat ply stack and forming the stack. The full plies in the stack are tacked through their entire thickness and the partial plies are tacked to individual ones of the full plies in a manner that enables the plies to slip in relation to each other, preventing wrinkling and distortion of the plies during forming.

20 Claims, 11 Drawing Sheets

METHOD OF FABRICATING COMPOSITE LAMINATE STRUCTURES ALLOWING PLY SLIPPAGE DURING FORMING

BACKGROUND INFORMATION

1. Field

The present disclosure generally relates to fabrication of composite laminate structures, and deals more particularly with a method of forming contours in a flat composite ply stack that allows ply slippage during the forming process.

2. Background

When stacking and collating multi-ply composite laminates, it may be desirable to maintain desired ply locations and/or ply orientations in order to meet design requirements. In the case of reinforced laminates using thermoset resins, it may be relatively easy to maintain ply locations and orientations due to the inherent tackiness of thermoset polymers. However, other types of composites, such as reinforced thermoplastic resins, may lack the tackiness of theromsets. Therefore, thermoplastic resin plies may need to be staked or tacked together in order to maintain the desired ply locations and/or orientations during collation and subsequent forming and consolidation processes.

Challenges may arise when forming tacked ply stacks into cross sectional part shapes that are contoured, such as those having tightly radiused corners. Depending on the location of the ply tacks, the tacks may result in ply distortion, buckling and/or wrinkling in the finished part because of the reduced ability of the plies to slip relative to each other during the forming process. Currently, this problem is solved primarily by trial and error placement of the tacks. However, the trial and error approach may be timing consuming, may increase material scrap and may not always be effective in eliminating ply buckling, distortion and/or wrinkling.

Accordingly, there is a need for a method of fabricating contoured composite laminates with ply build-ups using tacked plies that allows ply slippage when a flat composite ply stack is formed into a part having a contoured cross sectional shape. There is also a need for a method of fabricating contoured thermoplastic laminates having ply build-ups that reduces ply buckling, distortion and/or wrinkling.

SUMMARY

The disclosed embodiments provide a method of fabricating composite structures having contoured cross sectional shapes, such as reinforced thermoplastic resin laminates, which require flat ply stacks with partial ply build-ups to be formed with tight radii. The partial ply build-ups are free to slip relative to full plies during the forming process as a result of the location and thickness of ply tacks used to maintain the location and orientation of the plies. The full plies are tacked together in medial regions of the ply stack, through the entire thickness of the stack. The partial plies are tacked to individual ones of the full plies in peripheral regions of the stack in order to allow ply slippage when the stack is formed into contoured cross sectional shapes and/or around tight radii.

According to one disclosed embodiment, a method is provided of fabricating a contoured composite structure, comprising assembling a substantially flat ply stack and forming the play stack into a contoured cross sectional shape. Assembling the ply stack includes placing a plurality of full plies, tacking the full plies together, placing at least one partial ply, and tacking the at least one partial ply to one of the full plies. Tacking the full plies is performed in a medial region of the ply stack by tacking the full plies through substantially the entire thickness of the full plies in the stack. Tacking the at least one partial ply is performed within a peripheral region of the ply stack. Assembling the flat ply stack may also include placing a plurality of the partial plies, and tacking each of the partial plies to one of the full plies. Placing the partial plies may include offsetting the partial plies along at least one edge of the full plies, and tacking the partial plies includes offsetting the tacks between the partial plies and the full plies.

According to another embodiment, a method is provided of assembling a flat composite ply stack that allows ply slippage when the ply stack is formed into a contoured cross sectional shape. The method includes placing a plurality of full plies, tacking the full plies together in a medial region of the ply stack, forming a ply build-up by interleafing partial plies between at least certain of the full plies, and tacking each of partial plies to one of the full plies. Each of the full plies and the partial plies may be a fiber reinforced thermoplastic resin.

According to still another disclosed embodiment, a method is provided of fabricating a composite laminate beam having at least one contour in the cross section. The method comprises assembling a substantially flat ply stack having a web portion and a flange portion, including interleafing full plies and partial plies. The method further comprises tacking the full plies together and tacking each of the partial plies to one of the full plies such that each of the full plies having a partial ply tacked thereto may slip relative to an adjacent full ply. The method also includes forming the flat ply stack into the shape of the beam having a web portion and a flange portion, including forming a radius in the ply stack between the web portion and the flange portion.

According to another embodiment, a method is provided of fabricating a composite structure having a contoured cross sectional shape. The method comprises assembling a ply stack and forming the ply stack. Assembling the ply stack includes repeatedly placing a least one full ply, placing at least one partial ply, and tacking the partial ply to the full ply in a peripheral region of the full ply. The full plies are tacked together in a medial region of the full plies. Tacking the full plies together is performed after all of the full plies have been placed.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
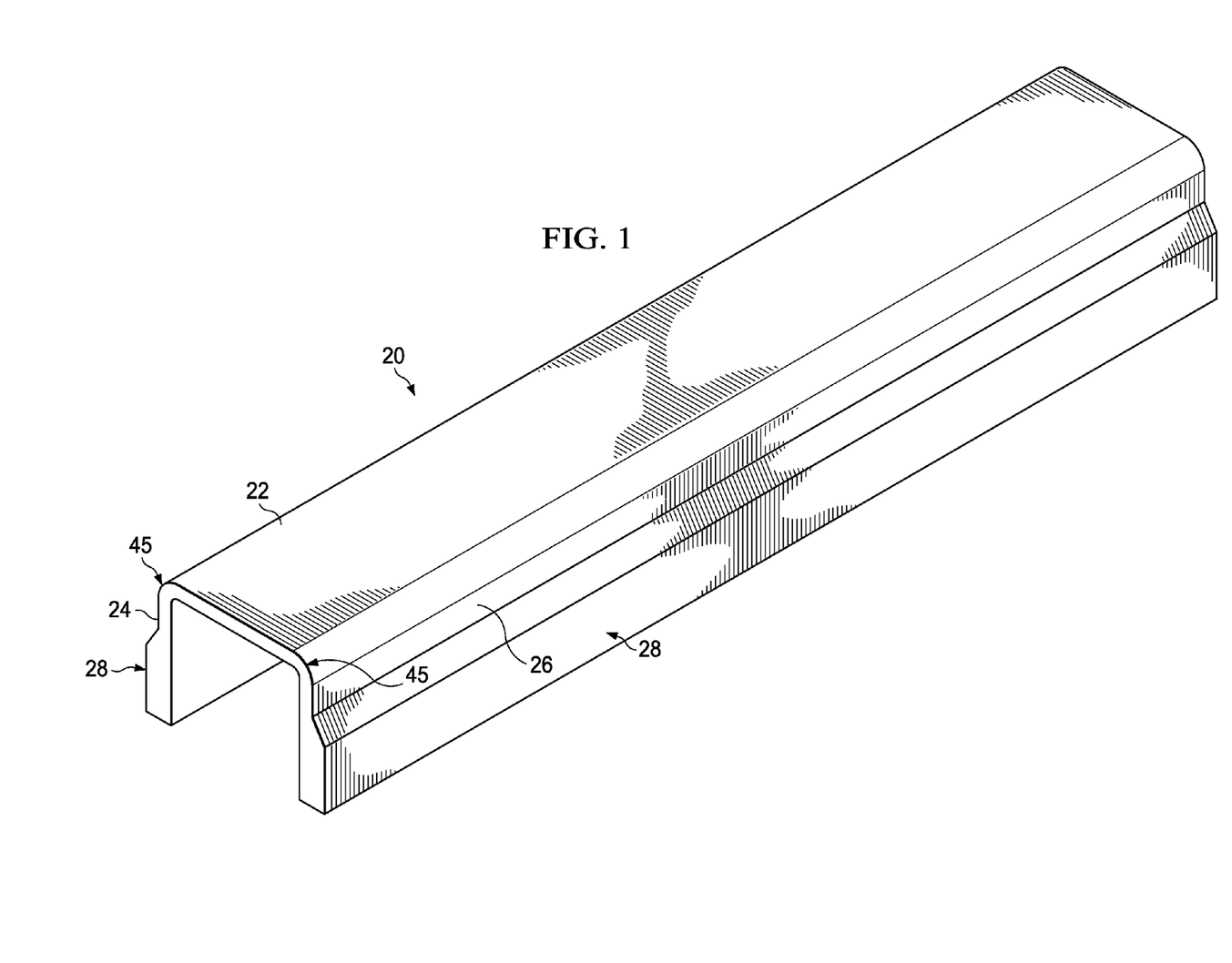
FIG. 1 is an illustration of a perspective view of a composite structure having a contoured cross section fabricated according to the disclosed method.

The disclosed embodiments involve a method of fabricating a composite structure such as, for example and without limitation, a beam 20 having a contoured cross sectional shape which in the illustrated example is a C-shape. The C-shaped cross section of the beam 20 is formed by a web portion 22 and a pair of generally parallel flange portions 24, 26, respectively. The web portion 22 is connected to each of the flange portions 24, 26 by a relatively tightly radiused corners 45. The flange portions 24, 26 include ply-build ups forming flange reinforcements 28 which may provide the beam 20 with increased stiffness. And used herein, "contour" refers to a contour or non-planar shape that requires a flat ply stack 30 (FIG. 2) to be formed around relative tight radii, such as the radiused corners 45. As will be discussed below, the beam 20 may comprise laminated plies of a fiber reinforced resin, such as, without limitation, a thermoplastic, which are tacked together in a manner that allows slippage of the plies during forming of the beam 20. The fiber reinforcement may unidirectional or bidirectional. While a beam 20 is illustrated in the exemplary embodiment, the disclosed method may be employed to fabricate a wide range of composite structures of varying cross sectional shapes that have one or more features formed by ply build-ups.

Figure 2:
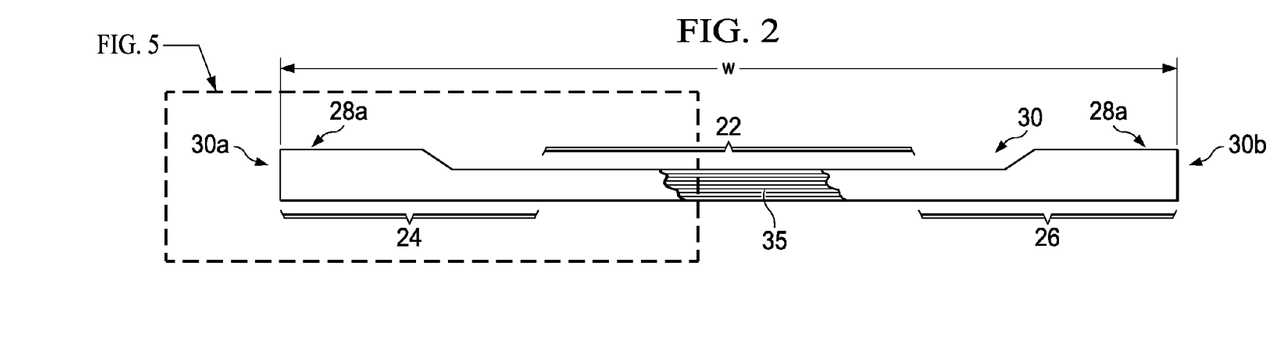
FIG. 2 is an illustration of an end view of a flat ply stack used to fabricate the composite structure shown in FIG. 1.

Referring now to FIG. 2, the composite beam 20 shown in FIG. 1 may be fabricated by assembling a substantially flat, rectangularly shaped ply stack 30 comprising a plurality of collated individual flat plies 35 of a fiber reinforced resin, such as a thermoplastic resin. For example, and without limitation, the thermoplastic resin may comprise Polyetheretherketone (PEEK), Polyetherketoneketone (PEKK), Polyphenylene Sulfide (PPS), or Polyetherimide (PEI). The disclosed method embodiments may also be applicable to other types of polymer resin plies that may require tacking, including but not limited to thermosets lacking a desired tackiness, and hybrid resins employing a combination of thermoplastics and thermosets. The flat ply stack 30 has a width W and includes a web portion 22 flanked by flange portions 24, 26. The edges 30a, 30b of the flat ply stack 30 each include ply ramps 28a which form the reinforcements 28 shown in FIG. 1. As will be discussed below in more detail, the plies 35 may be formed of a resin such as a thermoplastic that may lack sufficient tackiness to hold the plies 35 in a desired locations or orientations relative to each other. According to the disclosed embodiments, certain of the plies 35 may be tacked together in a manner that maintain relative ply locations and/or orientations while allowing the plies 35 to slip relative to each other when the ply stack 30 is formed around tool contours or radii.

Figure 3:
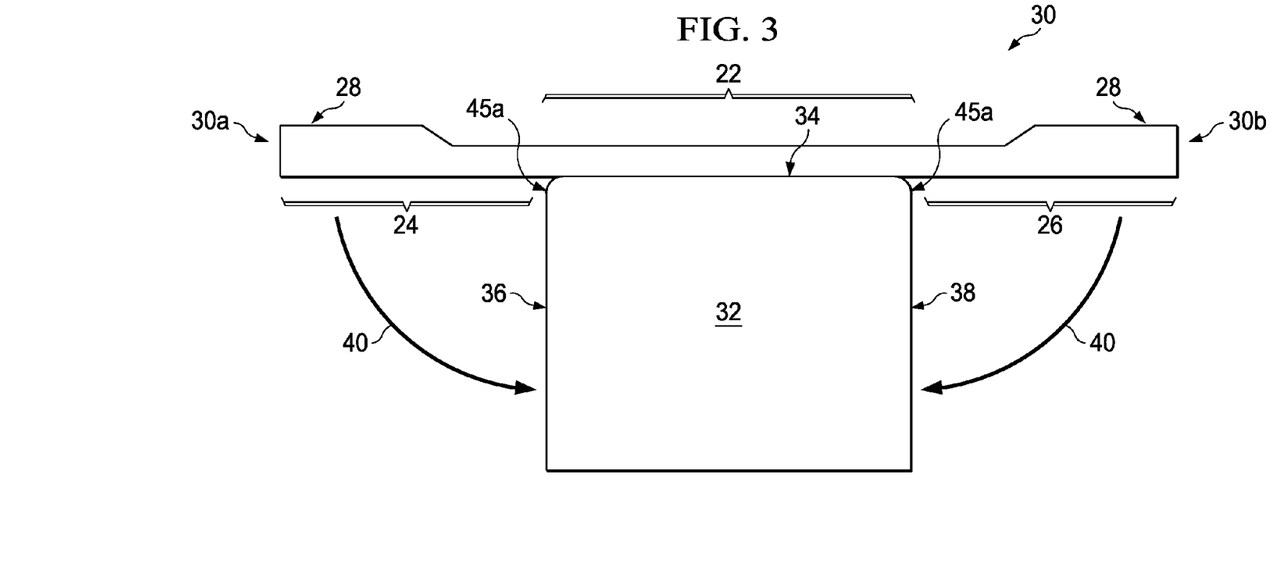
FIG. 3 is an illustration of the flat ply stack shown in FIG. 2, placed on a forming tool in preparation for stack forming.
Figure 4:
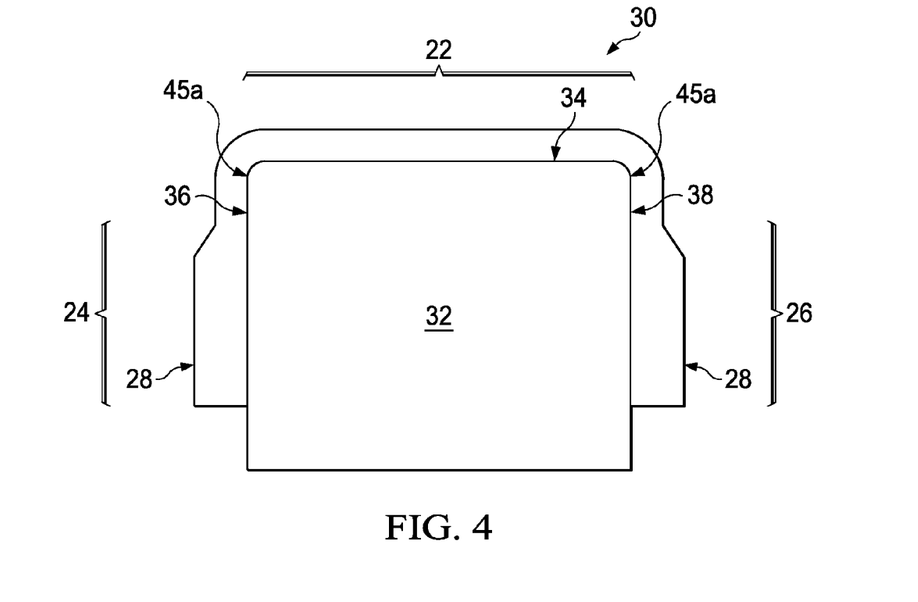
FIG. 4 is an illustration similar to FIG. 3 but showing the flat ply stack being formed around tight radii of the tool.

The flat ply stack 30 shown in FIG. 2 may be formed into the beam 20 shown in FIG. 1 using any of several suitable fabrication techniques and equipment. For ease of description, the simple forming tool 32 shown in FIGS. 3 and 4 may be used as a mandrel onto which the flat ply stack 30 may be formed. Referring particularly to FIGS. 3 and 4, the forming tool 32 includes a flat upper tool surface 34 joined to a pair of generally parallel side tool surfaces 36, 38 by radiused corners 45a. The web portion 22 of the flat ply stack 30 may be placed on the upper tool surface 34 (FIG. 3), following which the flange portions 24, 26 are formed around the corners 45a down onto tool surfaces 36, 38, as shown in FIG. 4. As previously mentioned, other equipment and techniques may be used to carry out the forming process, including but not limited to continuous, incremental forming processes described in US Patent Publication Nos. 20110206906, published Aug. 25, 2011 and 20070175575 published Aug. 2, 2007, the entire disclosures of which patent publications are incorporated by reference herein. In the patent publications mentioned above, consolidation tooling (not shown) in a pre-consolidation stage (not shown) is used to heat and partially form a flat ply stack 30, following which the consolidation tooling is used to fully form and consolidate the ply stack 30 into a finished part.

Figure 5:
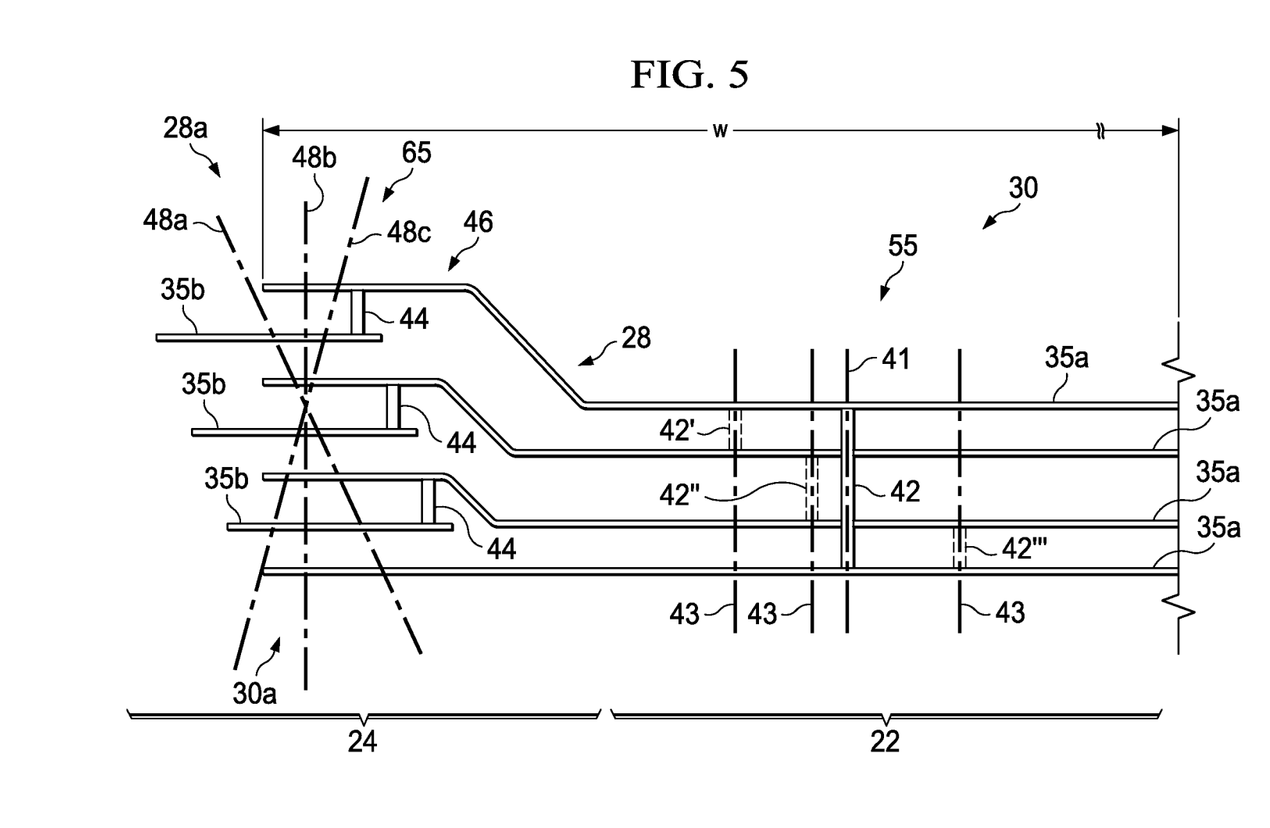
FIG. 5 is an illustration of the area designated as FIG. 5 in FIG. 2, showing several of the plies exploded to better reveal the positions of tacks between the plies, alternative locations of the full ply tacks being indicated in broken lines.

Referring now to FIG. 5, the flat ply stack 40 comprises a plurality of collated full plies 35a and a plurality of interleafed partial edge plies 35b which are stepped or ramped to form the ply ramps 28a. The full plies 35a extend across nearly the entire width W of the flat ply stack 30. The partial edge plies 35b are located at the outer edges 30a, 30b of the flat ply stack 30, overlapping the full plies 35a. The partial edge plies 35b extend laterally beyond the outer edges 46 of the full plies 35a and are offset relative to each other to form the ply ramps 28a.

In the embodiment shown in FIG. 5, each of the partial edge plies 35b is tacked to one of the full plies 35a by a tack 44 in a peripheral region 65 of the stack 30, near the outer edge 46 of the full plies 35a. Thus, tacks 44 are two ply tacks. The tacks 44 are offset relative to each other, similar to the offsetting of the partial edge plies 35b. Each of the tacks 44 may be produced by localized interlaminar melting between a partial edge ply 35b and a full ply 35a, carried out using a suitable method, such as without imitation, heat staking or ultrasonic welding. The full plies 35a are tacked together in a medial region 55 of the stack 30. In one embodiment, the full plies 35a may be tacked together in the medial region 55 by a through-the-thickness tack 42 that extends though substantially the entire thickness of the stack 30 in the medial region 55 and lies substantially within a single plane 41 in order to maintain the global ply orientation and ply boundary locations. The through-the-thickness tack 42 may be formed by tacking all of the full plies 35a together at one time after the full plies 35a have been placed and collated, and the partial plies 35b have been placed and tacked to the full plies 35a. In another embodiment, as will become apparent from FIGS. 6-9 discussed below, the through-the-thickness tack 42 may be formed as a series of vertically aligned, individual tacks between the full plies 35a as the full plies 35a are being successively placed on top of each other. Alternatively, the through-the-thickness tack 42 may be formed by tacking more than two of the full plies 35a together at a time during the ply placement process.

In the example shown in 5, the through-the-thickness tack 42 lies substantially in a single plane 41, however in other embodiments, the full plies 35a may be tacked together in the medial region 55 by multiple tacks 42', 42", 42''' (shown in broken lines) between two or more of the full plies 35a respectively lying in planes 43 that are offset from each other within the medial region 55 of the ply stack 50.

In the illustrated example, the through-the-thickness tack 42 is a single row tack located in the center of the ply stack 30, however other locations are possible. Tacks 42 may be referred to as multiple ply tacks. The location of the tacks 42, 44 is chosen such that they do not substantially inhibit interlaminar ply slippage and/or trap ply material between the tacks 42, 44 during the downstream forming process. For example, in the case of the beam 20 shown in FIG. 1, tacks through the full thickness of the flange portion 24, 26 should be avoided since full thickness tacks in this area may prevent the plies 35 from slipping relative to each other in this area. When the flat ply stack 30 has been assembled, peripheral regions 65 of the stack 30 may be trimmed using suitable equipment such as an ultrasonic cutter (not shown), along trim lines, e.g. 48a, 48b, 48. This trimming of the stack 30 may be required in order to align the outer edges of the flat ply stack 30 with consolidation tooling (not shown) and achieve desired consolidation pressures, or to produce a net shaped finished part that may not need trimming following consolidation, or very little trimming.

Figure 6:
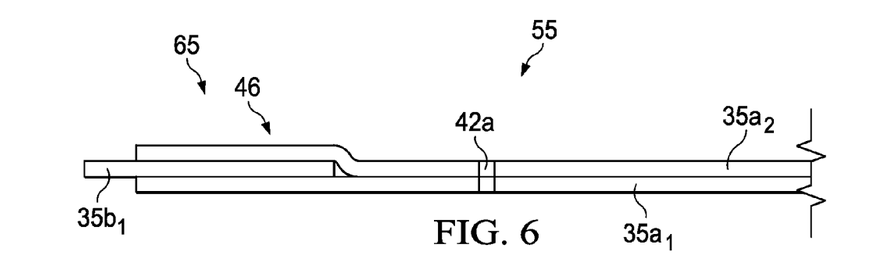
FIGS. 6-9 illustrate stacking and tacking of successive plies forming part of the flat ply stack shown in FIG. 2.
Figure 7:
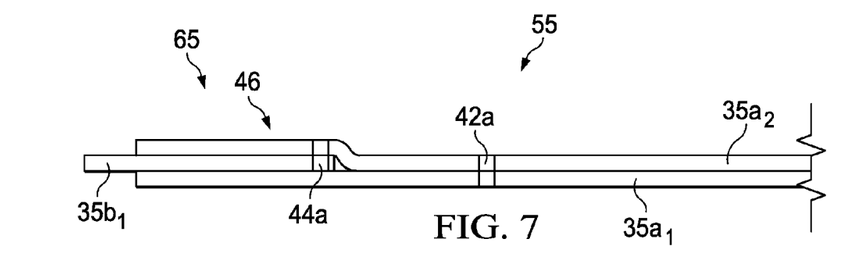
Figure 8:
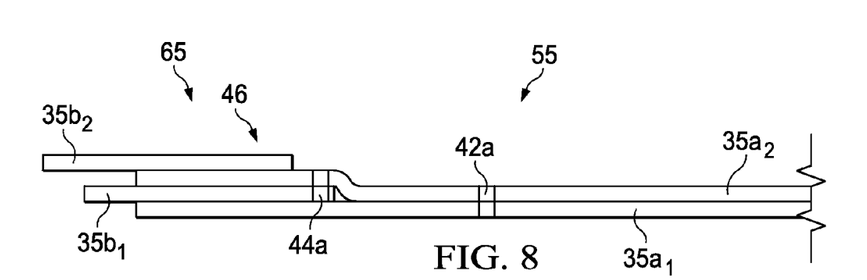
Figure 9:
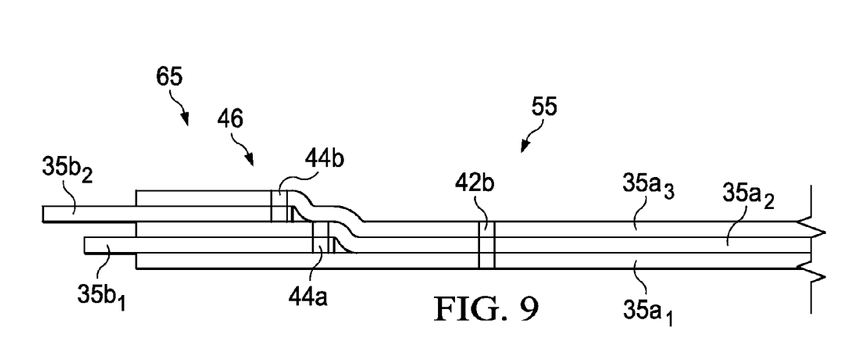

FIGS. 6-9 illustrate successive steps of placing three of the full plies $35a_1$, $35a_2$, $35a_3$, and two of the partial edge plies $35b_1$, $35b_2$. Referring to FIG. 6 after a first full ply $35a_1$ is laid down, a first partial edge ply $35b_1$ is placed on top of the first full ply $35a_1$, overlapping the outer edge 46 of the first full ply $35a_1$. Then, a second full ply $35a_2$ is placed over the first ply $35a_1$, overlapping the first partial edge ply $35b_1$. Next, a first tack 42a may be made in a medial area 55, between the two full plies $35a_1$, $35a_2$. As shown in FIG. 7, a tack 44b is also made between full ply $35a_2$ and the first partial edge ply $35b_1$. Referring to FIG. 8, a second partial edge ply $35b_2$ is placed over the edge 46 of full ply $35a_2$, spaced laterally outward from the tack 44a. Next, as shown in FIG. 9, a third full ply $35a_3$ is placed. The outer edge 46 of the third full ply $35a_3$ overlaps the second partial ply $35b_2$, and a second tack 44b is made between partial ply $35b_1$ and full ply $35a_3$, just outboard of the first tack 44a. A tack 42b is made between the full ply $35a_3$ and the underlying full ply $35a_2$. The process illustrated in FIGS. 6-9 is repeated until the flat ply stack 30 has been fully assembled. Other variations in placement and tacking of the full and partial edge plies 35a, 35b, respectively are possible. For example, as previously mentioned, the through-the-thickness tack 42a may be formed after all of the full plies 35a are placed and collated, rather than as a series of individual tacks made as the individual full plies 35a are being placed. Also, each of the partial edge plies 35a may be attached by a two ply tack 44a to any adjacent full ply 35a; thus, in the example shown in FIGS. 6-9, partial ply $35b_1$ may be attached by a tack 44a to the underlying full ply $35a_1$, rather than to the overlying full ply $35a_2$. Similarly, partial ply $35b_2$ may be attached by a two ply tack 44b to the underlying full ply $35a_2$, rather than to the overlying full ply $35a_3$. Further, while the full and partial plies 35a, 35b respectively are shown as alternating in their order within ply stack 30, they need not alternate, as will become apparent from further illustrative embodiments discussed below.

Figure 10:
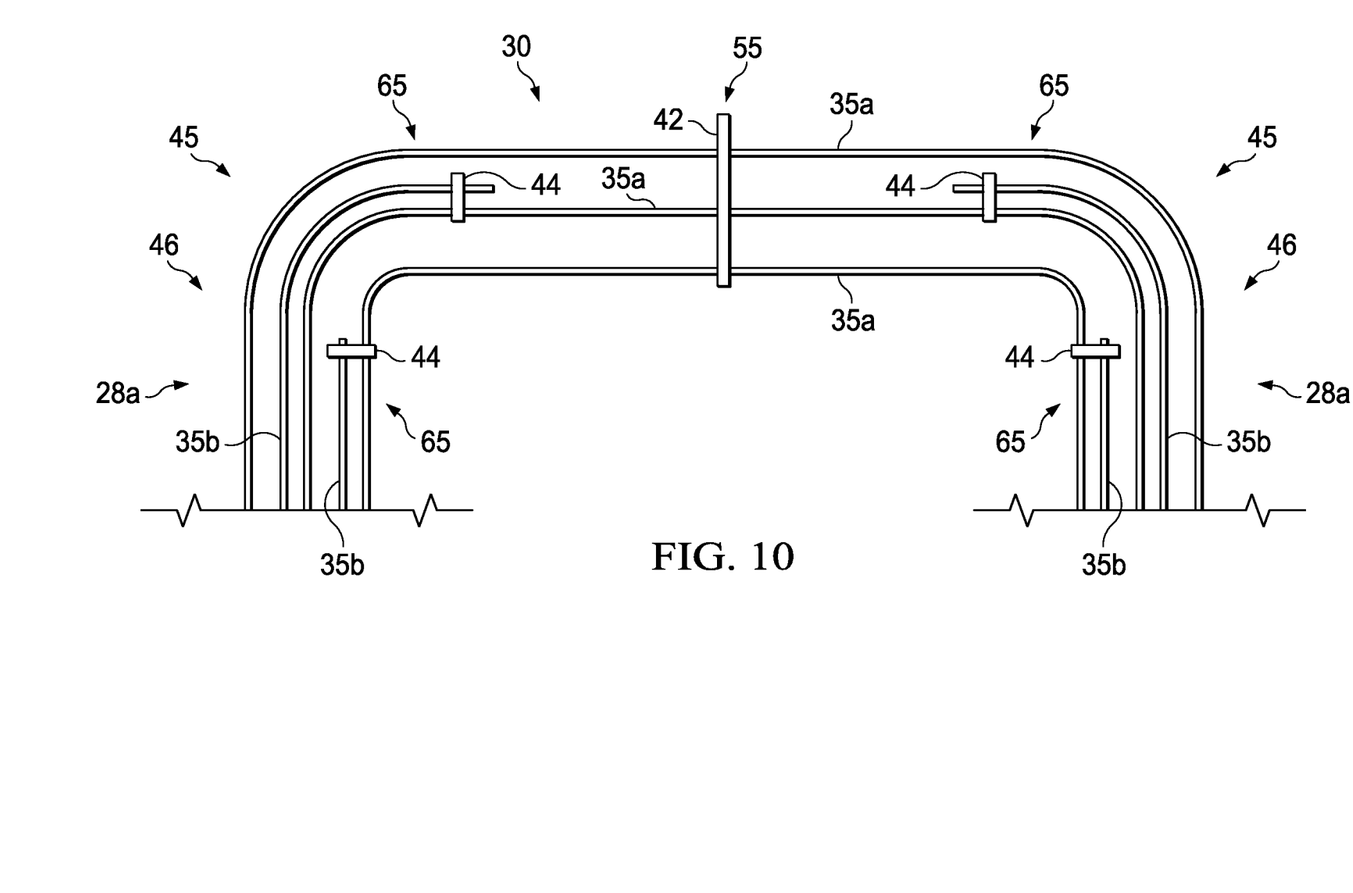
FIG. 10 is an illustration of a sectional view showing several exploded plies of the flat ply stack after the forming process.

FIG. 10 illustrates the relative positions of the plies 35a and 35b as well as the tacks 42, 44 shown in FIG. 5 after the flat ply stack 30 has been formed over the tool 32 shown in FIGS. 3 and 4. As the flat ply stack 30 is being formed around the radiused corners 45a (FIG. 3) of the tool 32, the full plies 35a are free to slip and form relative to each other as the full plies 35a move from a larger radius to a smaller radius as the radiused corners 45 (FIG. 1) are being formed. Since the partial edge plies 35b are tacked only to individual ones of the full plies 35a, each of the partial edge plies 35b may also slip and form along with the full ply 35a to which it is tacked.

Tacking of the partial edge plies 35b to individual adjacent ones of the full plies 35a permits relative ply slippage, thereby substantially reducing or eliminating ply material being trapped which may cause ply distortion, wrinkling or buckling during the forming process. The tack 42 extending through the entire thickness of the full plies 35a in the medial region 55 maintains the location and orientation of the plies 35a, 35b during the forming and consolidation process. It should be noted here that while offset edge plies 35b have been illustrated for producing ply ramps 28a along the flange portions 24, 26, the principles of the disclosed embodiments may be employed to produce other features of a highly contoured composite cross section structure, including but not limited to structural members having "I", "T", "J" or "Z" cross sectional shapes. Also, while the ply ramps 28a are shown along two opposites edges of the ply stack 30 shown in FIG. 5, ply build-ups may be formed by locating the partial plies 35b along only one edge, or along more than two edges of the ply stack 30, or along all of the edges of the play stack 30.

Figure 11:
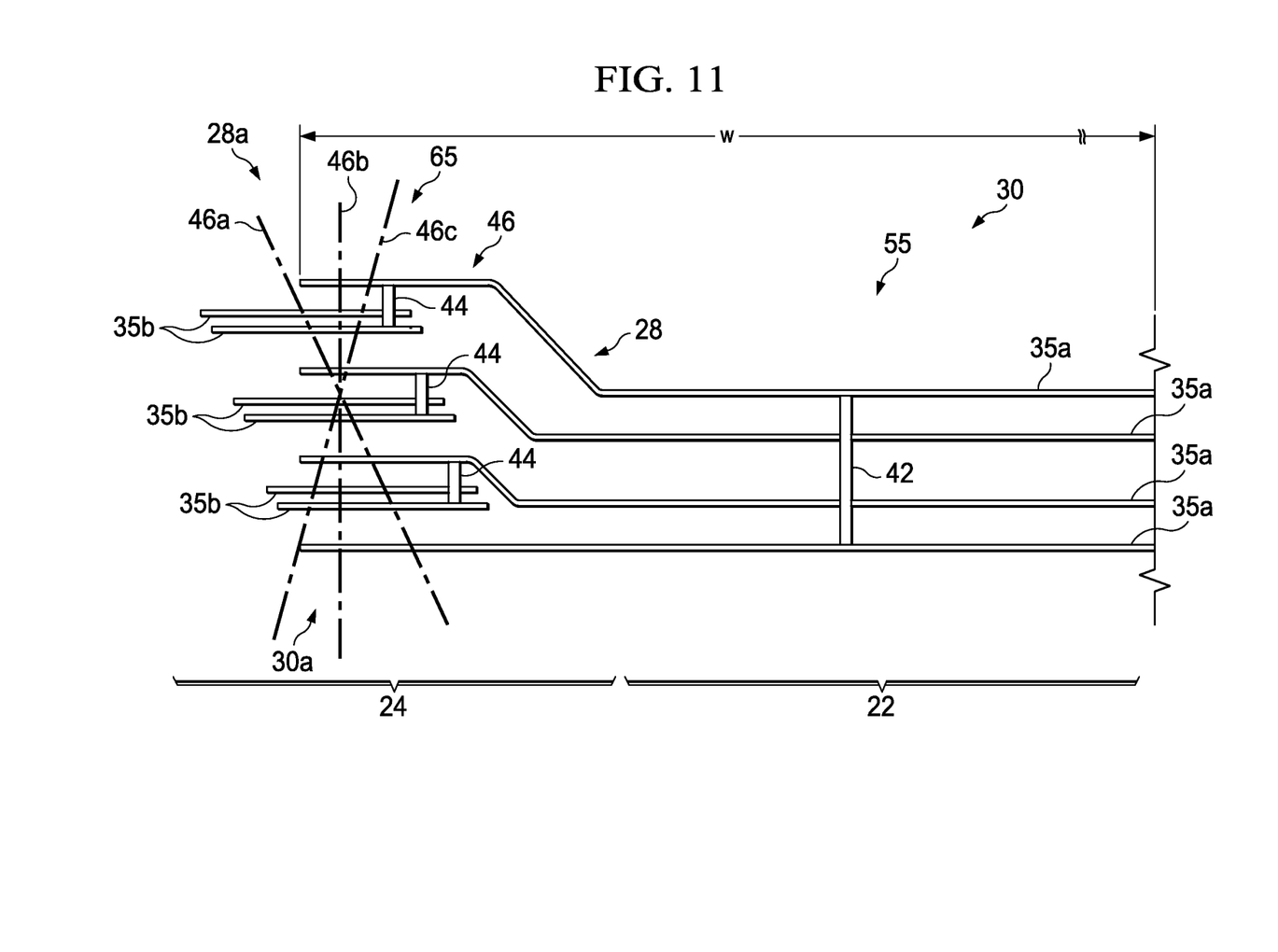
FIG. 11 is an illustration of a view similar to FIG. 5 but showing groups of two partial plies respectively tacked to the edges of individual full plies.

FIG. 11 illustrates an alternate embodiment in which a pair of a partial edge plies 35b are tacked at 44 to individual ones of the full plies 35a. In this embodiment, each pair of the partial edge plies 35b may slip during forming along with the full ply 35a to which they are attached. In other embodiments, it may be possible to tack more than two of the partial plies 35b to an individual adjacent full ply 35a. In this exemplary embodiment, the partial plies 35b lie below the full ply 35a to which they are tacked, however in other embodiments, these partial plies 35b may instead lie above the full ply 35a to which they are tacked.

Figure 12:
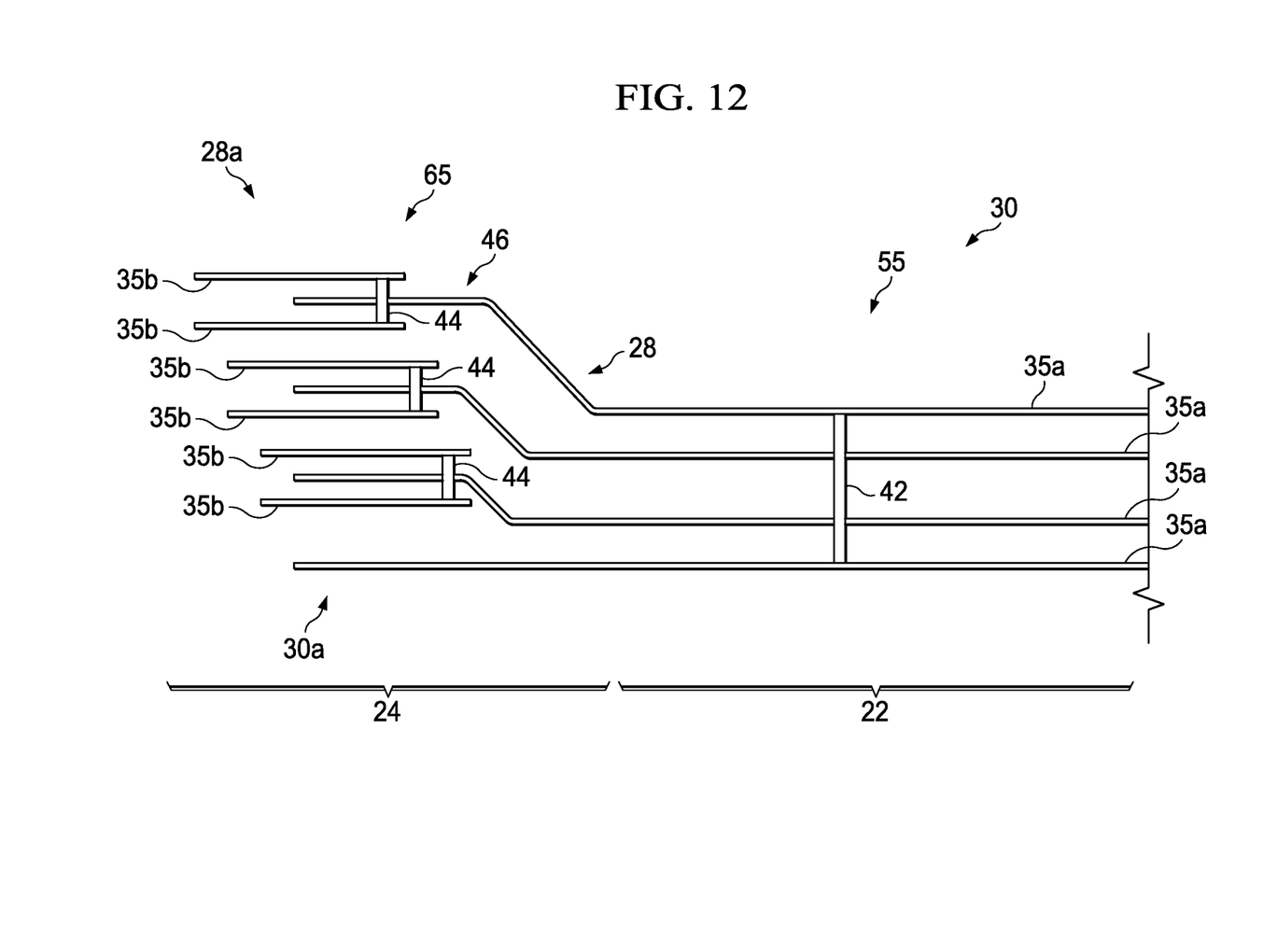
FIG. 12 is an illustration of a view similar to FIG. 5 but showing two partial plies respectively tacked to opposite sides of individual full plies.

FIG. 12 illustrates still another embodiment in which two partial edge plies 35b are attached respectively on opposite sides of individual full plies 35a by tacks 44. It may be possible to attach more than one of the partial edge plies 35b to each side of one or more of the full plies 35a. Also, as shown in this example, at least certain of the full plies 35a' may not have any of the partial edge plies 35b tacked thereto. Also, the number of partial plies 35b tacked to each of the full plies 35a may vary. For example, a single partial edge ply 35b may be tacked to a full ply 35a in one section of the ply stack 30, while in other sections of the ply stack 30, two or more partial plies 35b may be tacked to individual ones of the full plies 35a. As in previous examples, the location and depth of the tacks 44 allow the partial plies 35b to form along with the full plies 35a to which they are tacked, and the full plies 35a are allowed to slip relative to each other during the forming process.

Figure 13:
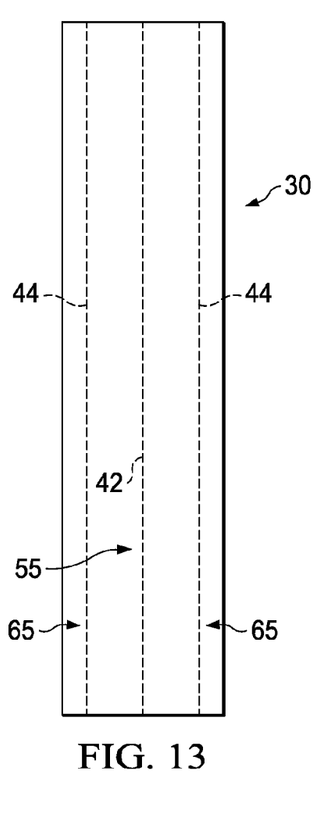
FIG. 13 is an illustration of a plan view of the flat ply stack shown in FIG. 2, showing the use of continuous tacks.
Figure 14:
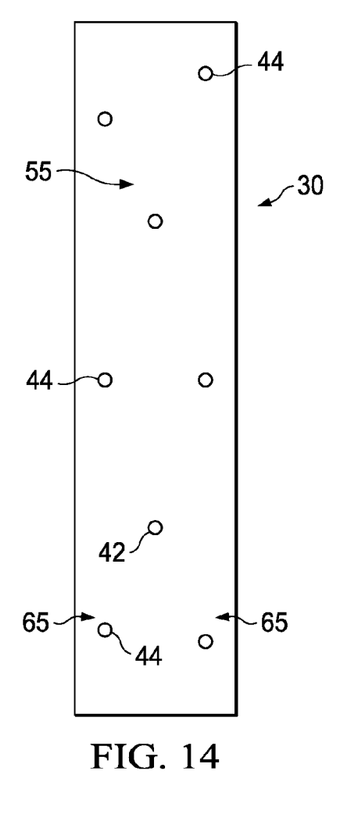
FIG. 14 is an illustration similar to FIG. 13 but showing the use of point tacks.
Figure 15:
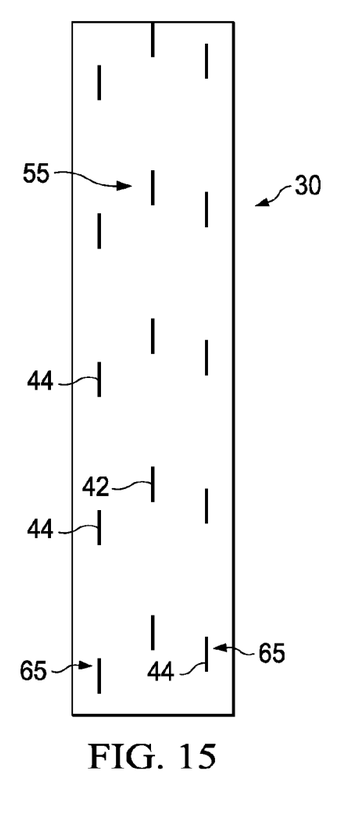
FIG. 15 is an illustration similar to FIG. 13 but showing spaced apart line tacks.

As previously mentioned, the tacks 42, 44 may be formed using any of several suitable methods including heat staking and ultrasonic welding. The tacks 42, 44 may continuous or discontinuous. For example, FIG. 13 illustrates tacks 42, 44 that are substantially continuous along the length of the flat ply stack 30. Alternatively, as shown in FIG. 14, the tacks 42, 44 may be formed at individual spaced apart points along the length of the ply stack 30. In still another embodiment, as shown in FIG. 15, each of the tacks 42, 44 may be performed along lines that are spaced apart along the length of the stack 30.

Figure 16:
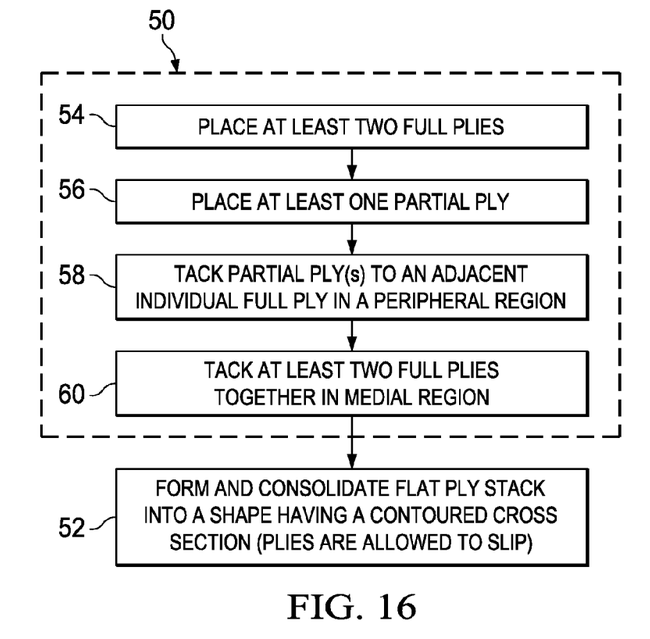
FIG. 16 is an illustration of a flow diagram of one embodiment of a method of fabricating a composite structure having a contoured cross section which allows ply slippage during forming.

Attention is now directed to FIG. 16 which illustrates the overall steps of one embodiment of a method of fabricating a composite structure having a contoured cross sectional shape, that allows ply slippage during the forming process in order to reduce or eliminate ply buckling, distortion and/or wrinkling. At 50, a flat ply stack 30 is assembled which is then formed and consolidated at 52. The individual full plies 35a along with the partial edge plies 35b are allowed to slip relative to each other during the forming and consolidation process 52. Assembling the flat ply stack 30 at 50 includes placing at least two full plies 35a at 54, and placing at least one partial ply 35b at 56. At 58, the at least one partial ply 35b is tacked to an adjacent individual one of the full plies 35a in a peripheral 65 region of the ply stack 30. The full plies 35a placed at 54 are tacked together in a medial region 55 of the stack 30 at 60, either after the ply stack 30 is assembled, or incrementally as the full and partial edge plies 35a, 35b are being placed.

Figure 17:
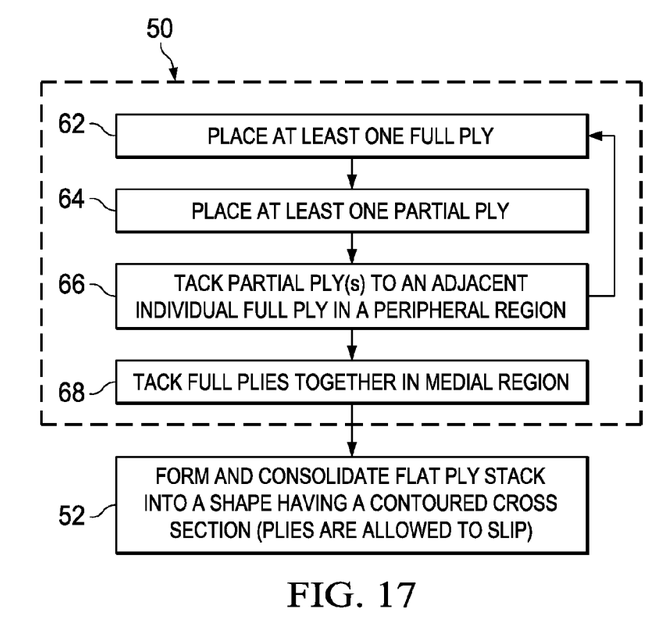
FIG. 17 is an illustration of a flow diagram of another embodiment of the fabrication method.

FIG. 17 illustrates an alternate embodiment of the disclosed fabrication method. Similar to the embodiment shown in FIG. 16, at 50, a flat ply stack 30 is assembled which is then formed and consolidated at 52. The individual full plies 35a along with the partial edge plies 35b are allowed to slip relative to each other during the forming and consolidation process 52. At step 62, at least one full ply 35a is placed, and 64 at least one partial ply 35b is placed. At 66, one or more of the partial plies 35b placed at 64 is tacked to an adjacent one of the full plies 35a. As previously discussed, in step 66, multiple partial plies 35b may be tacked to a single one of the full plies 35a, on either or on both sides of that full ply 35a. Steps 62, 64, 66, and optionally step 68, are successively repeated until the entire flat ply stack 30 is assembled and collated. Alternatively, as previously discussed, step 68 may be performed after all of the full plies 35a have been paced.

Figure 18:
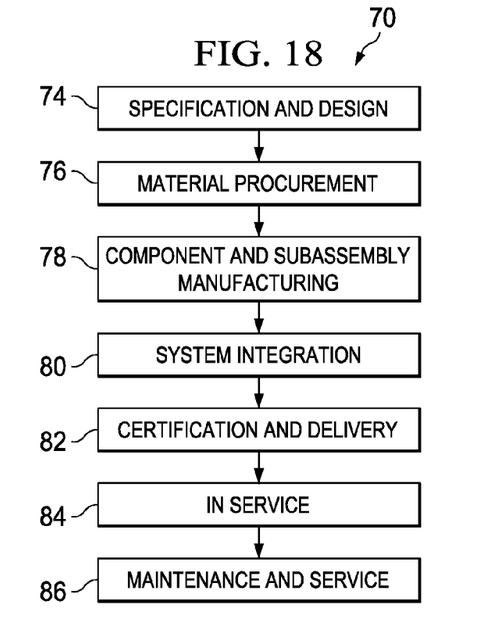
FIG. 18 is an illustration of a flow diagram of aircraft production and service methodology.
Figure 19:
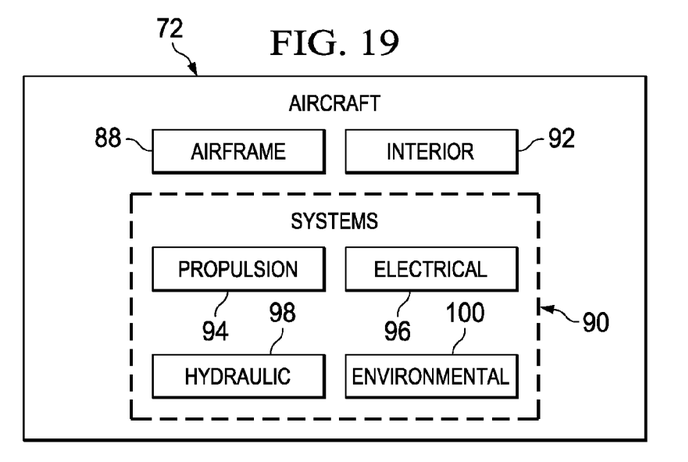
FIG. 19 is an illustration of a block diagram of an aircraft.

Embodiments of the disclosure may find use in a variety of potential applications, particularly in the transportation industry, including for example, aerospace and other applications. Thus, referring now to FIGS. 18 and 19, embodiments of the disclosure may be used in the context of an aircraft manufacturing and service method 70 as shown in FIG. 18 and an aircraft 72 as shown in FIG. 19. Aircraft applications of the disclosed embodiments may include, for example, without limitation, fabrication of any of a wide range of composite parts and components, such as stiffener members including beams, spars and stringers, to name only a few. During pre-production, exemplary method 70 may include specification and design 74 of the aircraft 72 and material procurement 76. During production, component and subassembly manufacturing 78 and system integration 80 of the aircraft 72 takes place. Thereafter, the aircraft 72 may go through certification and delivery 82 in order to be placed in service 84. While in service by a customer, the aircraft 72 is scheduled for routine maintenance and service 86, which may also include modification, reconfiguration, refurbishment, and so on.

Each of the processes of method 70 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 72 produced by exemplary method 70 may include an airframe 88 with a plurality of systems 90 and an interior 92. Examples of high-level systems 90 include one or more of a propulsion system 94, an electrical system 96, a hydraulic system 98, and an environmental system 100. Any number of other systems may be included. Although an aerospace example is shown, the principles of the disclosure may be applied to other industries, such as the marine and automotive industries.

Systems and methods embodied herein may be employed during any one or more of the stages of the production and service method 70. For example, components or subassemblies corresponding to production process 78 may be fabricated or manufactured in a manner similar to components or subassemblies produced while the aircraft 72 is in service. Also, one or more apparatus embodiments, method embodiments, or a combination thereof may be utilized during the production stages 78 and 80, for example, by substantially expediting assembly of or reducing the cost of an aircraft 72. Similarly, one or more of apparatus embodiments, method embodiments, or a combination thereof may be utilized while the aircraft 72 is in service, for example and without limitation, to maintenance and service 86.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fabricating a composite structure having a contoured cross section, comprising:
   assembling a substantially flat ply stack, including—
      placing a plurality of full plies,
      tacking the plurality of full plies together in a medial region of the plurality of full plies,
      interleafing at least one partial ply and the plurality of full plies,
      tacking each partial ply to only one full ply in the plurality of full plies in a peripheral region of the plurality of full plies such that each of the full plies having a partial ply tacked thereto may slip relative to an adjacent full ply; and
   forming the substantially flat ply stack into a contoured shape.

2. The method of claim 1, wherein tacking the plurality of full plies is performed through substantially an entire thickness of the plurality of full plies in the substantially flat ply stack.

3. The method of claim 1, wherein assembling the substantially flat ply stack further includes:
   placing a plurality of partial plies, and
   tacking each of the plurality of partial plies to only one adjacent full ply of the plurality of full plies.

4. The method of claim 3, wherein placing the plurality of partial plies includes offsetting the plurality of partial plies relative to each other along at least one edge of the plurality of full plies.

5. The method of claim 4, wherein tacking the plurality of partial plies includes offsetting tacks between the plurality of partial plies and the plurality of full plies relative to each other.

6. The method of claim 1, wherein assembling the substantially flat ply stack includes:
placing a plurality of partial plies, and
tacking at least two partial plies of the plurality of partial plies to a same only one full ply of the plurality of full plies.

7. The method of claim 6, wherein the at least two partial plies are tacked respectively to opposite sides of the same only one full ply.

8. The method of claim 6, wherein assembling the substantially flat ply stack includes:
placing a plurality of partial plies between the full plies, and
tacking a different number of the plurality of partial plies respectively to each of two full plies of the plurality of full plies, wherein each partial ply of the plurality of partial plies is tacked to only one full ply of the plurality of full plies.

9. A method of assembling a composite ply stack that allows ply slippage when the composite ply stack is formed into a contoured cross sectional shape, comprising:
placing a plurality of full plies;
tacking the plurality of full plies together in a medial region of the plurality of full plies;
forming a ply build-up by interleafing partial plies between at least certain of the plurality of full plies; and
tacking each of the partial plies to only one full ply in the plurality of full plies in a peripheral region of the plurality of full plies such that each of the full plies having a partial ply tacked thereto may slip relative to an adjacent full ply.

10. The method of claim 9, wherein each of the full plies and the partial plies is a fiber reinforced thermoplastic resin.

11. The method of claim 9, wherein:
interleafing the partial plies includes offsetting the partial plies relative to each other, and
tacking each of the partial plies includes offsetting tacks between the partial plies and the plurality of full plies.

12. The method of claim 9, wherein tacking the plurality of full plies together includes forming tacks substantially through an entire thickness of the plurality of full plies along a tack line.

13. The method of claim 9, wherein interleafing the partial plies includes placing the partial plies between the plurality of full plies along outer edges of the plurality of full plies.

14. The method of claim 9, wherein interleafing the partial plies includes interleafing differing numbers of the partial plies between the plurality of full plies respectively in different sections of the composite ply stack.

15. A method of fabricating a composite laminate beam having at least one cross sectional contour, comprising:
assembling a substantially flat ply stack having a web portion and a flange portion, including—
interleafing full plies and partial plies,
tacking the full plies together in a medial region of the substantially flat ply stack,
tacking each of the partial plies to only one of the full plies in a peripheral region of the substantially flat ply stack such that each of the full plies having a partial ply tacked thereto may slip relative to an adjacent full ply; and
forming the flat ply stack into a shape of the beam having a web portion and a flange portion, including forming a radius in the ply stack between the web portion and the flange portion.

16. The method of claim 15, wherein interleafing the partial plies and the full plies includes placing the partial plies along edges of the full plies to form a ply build-up.

17. The method of claim 15, wherein interleafing the partial plies and the full plies includes offsetting the partial plies relative to each other along an edge of the full plies.

18. A method of fabricating a composite structure having a contoured cross section, comprising:
placing a full ply;
assembling a ply stack by repeatedly—
placing another full ply,
placing at least one partial ply to interleaf an adjacent full ply and the other full ply, and
tacking each partial ply to the only one other full ply in a peripheral region of the other full ply such that in the assembled ply stack each of the other full plies having a partial ply tacked thereto may slip relative to one another;
tacking the full plies together in a medial region of the full plies; and
forming and consolidating the ply stack after tacking the full plies together.

19. The method of claim 18, wherein:
tacking the full plies together is performed after all of the full plies have been placed.

20. The method of claim 1, wherein each of the full plies and the at least one partial ply is a fiber reinforced resin.

* * * * *